United States Patent
Chang

(10) Patent No.: US 10,602,031 B2
(45) Date of Patent: Mar. 24, 2020

(54) DISPLAY APPARATUS AND GAMMA CURVE COMPENSATION CIRCUIT AND DRIVING METHOD THEREOF

(71) Applicant: Au Optronics Corporation, Hsinchu (TW)

(72) Inventor: Chi-Huang Chang, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 137 days.

(21) Appl. No.: 15/867,748

(22) Filed: Jan. 11, 2018

(65) Prior Publication Data

US 2018/0367708 A1 Dec. 20, 2018

(30) Foreign Application Priority Data

Jun. 20, 2017 (TW) .............................. 106120503 A

(51) Int. Cl.
*H04N 5/202* (2006.01)
*G09G 3/36* (2006.01)

(52) U.S. Cl.
CPC .......... *H04N 5/202* (2013.01); *G09G 3/3607* (2013.01); *G09G 2320/0276* (2013.01); *G09G 2320/0673* (2013.01)

(58) Field of Classification Search
CPC ................. H04N 5/202; G09G 3/3607; G09G 2320/0276; G09G 2320/0673
See application file for complete search history.

(56) References Cited

U.S. PATENT DOCUMENTS

| 6,456,268 | B1 | 9/2002 | Takeda |
| 7,847,772 | B2 | 12/2010 | Choi et al. |
| 8,957,840 | B2 | 2/2015 | Shin et al. |
| 9,182,805 | B2 | 11/2015 | Kim et al. |
| 2005/0168490 | A1* | 8/2005 | Takahara ............ G09G 3/2014 345/690 |
| 2006/0238551 | A1 | 10/2006 | Dalal |
| 2007/0126975 | A1 | 6/2007 | Choi et al. |
| 2008/0252632 | A1 | 10/2008 | Im et al. |
| 2011/0025732 | A1* | 2/2011 | Wang .................. G09G 3/3611 345/691 |
| 2011/0163682 | A1* | 7/2011 | Jungwirth .......... H05B 33/0818 315/192 |
| 2013/0002641 | A1 | 1/2013 | Kim et al. |
| 2015/0170609 | A1* | 6/2015 | Jung ........................ G09G 3/20 345/212 |
| 2016/0042707 | A1* | 2/2016 | Wang .................. G09G 3/2044 345/214 |
| 2016/0203930 | A1* | 7/2016 | Aida ........................ H04B 3/44 307/113 |

(Continued)

FOREIGN PATENT DOCUMENTS

| CN | 1777927 | 5/2006 |
| CN | 1979260 | 6/2007 |

(Continued)

*Primary Examiner* — Sahlu Okebato
(74) *Attorney, Agent, or Firm* — JCIPRNET

(57) ABSTRACT

A display apparatus and a gamma curve compensation circuit and a driving method thereof are provided. Control the gamma curve compensation circuit to adjust data voltages provided to data lines according to a frame rate of the display apparatus, so as to perform gamma curve compensation and improve display quality of the display apparatus.

18 Claims, 5 Drawing Sheets

(56) References Cited

U.S. PATENT DOCUMENTS

2017/0018231 A1\* 1/2017 Liu ..................... G09G 3/3688

FOREIGN PATENT DOCUMENTS

| CN | 101286304 | 10/2008 |
| CN | 101882417 | 11/2010 |
| CN | 102855863 | 1/2013 |
| TW | 521244 | 2/2003 |
| TW | I348133 | 9/2011 |

\* cited by examiner

DISPLAY APPARATUS AND GAMMA CURVE COMPENSATION CIRCUIT AND DRIVING METHOD THEREOF

CROSS-REFERENCE TO RELATED APPLICATION

This application claims the priority benefit of Taiwan application serial no. 106120503, filed on Jun. 20, 2017. The entirety of the above-mentioned patent application is hereby incorporated by reference herein and made a part of this specification.

BACKGROUND OF THE INVENTION

Field of the Invention

The invention is related to an electronic device, and particularly to a display apparatus as well as a gamma curve compensation circuit and a driving method thereof.

Description of Related Art

To satisfy the needs for modern products with high speed, high efficiency and compact size, various kinds of electronic components have been developed with a slim design. Also, various portable electronic devices such as a notebook computer, a cell phones, an electronic dictionary, a personal digital assistant, a web pad, a tablet PC and the like become the main stream of the market. In terms of an image display panel of the portable electronic device, in order to meet the demands for products with minimized design, the liquid crystal display panel with superior characteristics of having good space utility efficiency, high quality, low power consumption and non-radiation has been popularized.

The liquid crystal panel can make the liquid crystal molecules therein to generate a twist angle via applying a driving voltage, thereby adjusting the light transmittance of the liquid crystal panel and driving the liquid crystal to display an image. However, the amount of driving voltage and the light transmittance of liquid crystal twist angle is not in a linear relationship; therefore, it is required to generate the driving voltage according to a gamma curve. Nonetheless, since the difference in frame rates or difference in color-resist materials of pixels with different colors all cause the current leakage of pixel in the interleaving period to change, leading to generation of shift in the gamma curve. As a result, color shift is occurred in the display image of the liquid crystal panel, thus deteriorating the display quality of the liquid crystal panel.

SUMMARY OF THE INVENTION

The invention provides a display apparatus and a gamma curve compensation circuit and a driving method thereof, which may effectively improving the display quality of the display apparatus.

The display apparatus of the invention includes a plurality of data lines, a data-line driving circuit, a plurality of gamma curve compensation circuits and a compensation control circuit. The gamma curve compensation circuits are respectively coupled to at least one corresponding data line and the data-line driving circuit. The data-line driving circuit provides data voltage to the data lines via the gamma curve compensation circuits so as to drive the data lines. The compensation control circuit is coupled to the gamma curve compensation circuits, and controls the gamma curve compensation circuits to adjust the data voltage provided to the data lines according to a frame rate of the display apparatus so as to perform gamma curve compensation.

In one embodiment of the invention, the compensation control circuit further controls the gamma curve compensation circuits to adjust the data voltages provided to the data lines according to a color of a pixel driven by at least one data line corresponding to the gamma curve compensation circuits.

In one embodiment of the invention, each of the gamma curve compensation circuits includes a variable resistance and a first rectifying circuit. The compensation control circuit adjusts a resistance value of the variable resistance according to the frame rate of the display apparatus. The first rectifying circuit and the variable resistance are connected in parallel between the data-line driving circuit and at least one data line corresponding to the first rectifying circuit, wherein a current which flows through the first rectifying circuit flows unidirectionally from the data-line driving circuit to the at least one data line corresponding to the first rectifying circuit.

In one embodiment of the invention, the compensation control circuit further controls the first rectifying circuit to adjust an amount of the current which flows through the first rectifying circuit according to a color a polarity of the pixel driven by the at least one data line corresponding to each of the gamma curve compensation circuits.

In one embodiment of the invention, the first rectifying circuit includes a rectifying diode; and a transistor. The transistor and the rectifying diode are connected in series between the data-line driving circuit and the at least one data line corresponding to the first rectifying circuit. A control end of the transistor is coupled to the compensation control circuit, and a degree of conductivity of the transistor is subject to the compensation control circuit.

In one embodiment of the invention, each of the gamma curve compensation circuits further includes a second rectifying circuit which is connected with the variable resistance and the first rectifying circuit in parallel between the data-line driving circuit and at least one data line corresponding to the second rectifying circuit. A current which flows through the second rectifying circuit flows unidirectionally from the at least one data line corresponding to the second rectifying circuit to the data-line driving circuit.

In one embodiment of the invention, the compensation control circuit further controls the second rectifying circuit to adjust an amount of the current which flows through the second rectifying circuit according to the color and polarity of the pixel driven by the at least one data line corresponding to each of the gamma curve compensation circuits.

In one embodiment of the invention, the second rectifying circuit includes a rectifying diode; and a transistor. The transistor and the rectifying diode are connected in series between the data-line driving circuit and the at least one data line corresponding to the second rectifying circuit. A control end of the transistor is coupled to the compensation control circuit, and the degree of conductivity of the transistor is subject to the compensation control circuit.

In one embodiment of the invention, each of the gamma curve compensation circuits includes a discharging circuit which is coupled between an end of the variable resistance and a common voltage. A control end of the discharging circuit is coupled to the compensation control circuit, and is subject to the compensation control circuit to discharge at least one data line corresponding to the discharging circuit to the common voltage before the pixel corresponding to the discharging circuit is driven.

The gamma curve compensation circuit of the invention is adapted to a display apparatus. The display apparatus includes a plurality of data lines. The gamma curve compensation circuit includes a variable resistance and a first rectifying circuit. The first rectifying circuit and the variable resistance are connected in parallel between the data-line driving circuit of the display apparatus and at least one data line corresponding to the first rectifying circuit. A current which flows through the first rectifying circuit flows unidirectionally from the data-line driving circuit to the at least one data line corresponding to the first rectifying circuit. A resistance value of the variable resistance varies along with a frame rate of the display apparatus so to adjust the data voltage provided to the data line to perform gamma curve compensation.

In one embodiment of the invention, the resistance value of the variable resistance further changes according to a color of a pixel driven by at least one data line corresponding to the gamma curve compensation circuit.

In one embodiment of the invention, the first rectifying circuit adjusts an amount of a current flowing through the first rectifying circuit according to the color and a polarity of the pixel driven by the at least one data line corresponding to the gamma curve compensation circuit.

In one embodiment of the invention, the first rectifying circuit includes a rectifying diode; and a transistor. The transistor and the rectifying diode are connected in series between the data-line driving circuit and the at least one data line corresponding to the first rectifying circuit. The transistor adjust a degree of conductivity according to the color and the polarity of the pixel driven by the at least one data line corresponding to the gamma curve compensation circuit.

In one embodiment of the invention, the gamma curve compensation circuit further includes a second rectifying circuit which is connected with the variable resistance and the first rectifying circuit in parallel between the data-line driving circuit and at least one data line corresponding to the second rectifying circuit. A current which flows through the second rectifying circuit flows unidirectionally from the at least one data line corresponding to the second rectifying circuit to the data-line driving voltage.

In one embodiment of the invention, the second rectifying circuit adjusts the amount of the current flowing through the first rectifying circuit according to the color and the polarity of the pixel driven by the at least one data line corresponding to the gamma curve compensation circuit.

In one embodiment of the invention, the second rectifying circuit includes a rectifying diode and a transistor. The transistor and the rectifying diode are connected in series between the data-line driving circuit and the at least one data line corresponding to the second rectifying circuit. The transistor adjusts the degree of conductivity according to the color and the polarity of the pixel driven by the at least one data line corresponding to the gamma curve compensation circuit.

In one embodiment of the invention, the gamma curve compensation circuits further includes a discharging circuit which is coupled between an end of the variable resistance and a common voltage, and discharges the at least one corresponding data line to the common voltage before the pixel corresponding to the discharging circuit is driven.

The invention further provides a driving method of a display apparatus, wherein the display apparatus includes a plurality of data lines and a data-line driving circuit. The driving method of the display apparatus includes the following steps. A plurality of gamma curve compensation circuits are provided to receive a plurality of data voltages from the data-line driving circuit. A gamma curve compensation circuit is controlled to adjust the data voltages provided to the data lines according to a frame rate of the display apparatus, so as to perform gamma curve compensation.

In one embodiment of the invention, the driving method of the display apparatus includes controlling the gamma curve compensation circuit to adjust the data voltages provided to the data lines according to the frame rate of the display apparatus and a color of a pixel driven by at least one data line corresponding to the gamma curve compensation circuit.

In one embodiment of the invention, the driving method of the display apparatus includes controlling the gamma curve compensation circuit to adjust the data voltages provided to the data lines according to the frame rate of the display apparatus, the color and a polarity of the pixel driven by the at least one data line corresponding to the gamma curve compensation circuit.

In one embodiment of the invention, the driving method of the display apparatus includes discharging the data lines to the common voltage before controlling the gamma curve compensation circuit to provide the data voltages to the data lines.

A display apparatus of the invention includes a plurality of data lines, a data-line driving circuit and a gamma curve compensation circuit. The gamma curve compensation circuit is coupled to at least one corresponding data line and the data-line driving circuit. The gamma curve compensation circuit includes a variable resistance and a first rectifying circuit. The variable resistance includes a first end, a second end and a control end. The first rectifying circuit includes a first end and a second end. The first end of the first rectifying circuit is electrically connected to the first end of the variable resistance. The second end of the first rectifying circuit is electrically connected to the second end of the variable resistance.

In one embodiment of the invention, the display apparatus further includes a second rectifying circuit including a first end and a second end. The first end of the second rectifying circuit is electrically connected to the second end of the variable resistance. The second end of the second rectifying circuit is electrically connected to the first end of the variable resistance.

In one embodiment of the invention, the display apparatus further includes a discharging circuit including a first end, a second end and a control end. The first end of the discharging circuit is electrically connected to the first end of the variable resistance. The second end of the second rectifying circuit is electrically connected to the common voltage.

In order to make the aforementioned features and advantages of the invention more comprehensible, embodiments accompanying figures are described in detail below.

DESCRIPTION OF EMBODIMENTS

Figure 1:
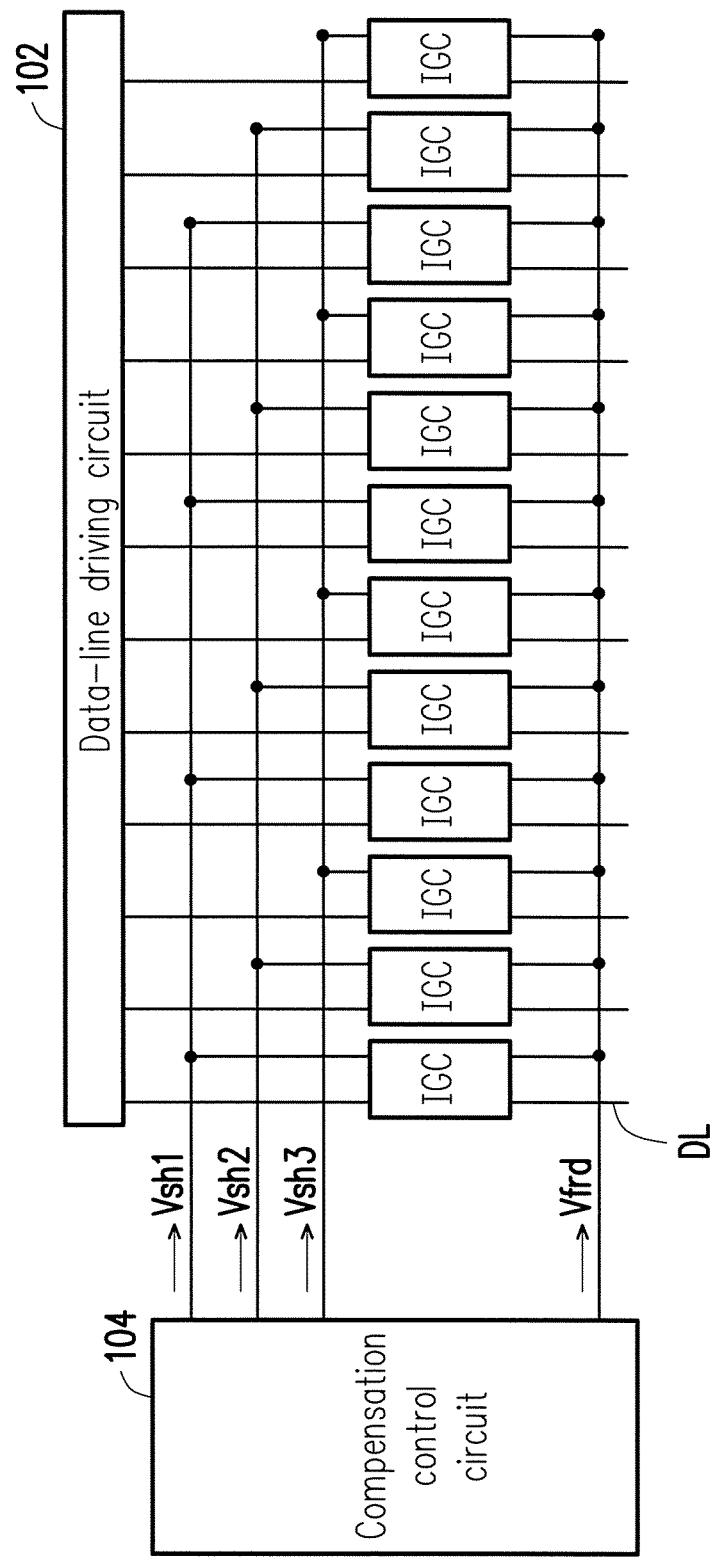
FIG. 1 is a schematic view of a liquid crystal display apparatus according to one embodiment of the invention.

FIG. 1 is a schematic view of a liquid crystal display apparatus according to one embodiment of the invention, but the invention is not limited to the liquid crystal display apparatus; any kinds of display apparatus which can control data voltage is applicable to the invention. Referring to FIG. 1, the liquid crystal display apparatus includes a data-line driving circuit 102, a compensation control circuit 104, a plurality of data lines DL and a plurality of gamma curve compensation circuits IGC. The gamma curve compensation circuits IGC are respectively coupled between the corresponding data lines DL and the data-line driving circuit 102. In addition, the compensation control circuit is coupled to each of the gamma curve compensation circuits IGC. The data-line driving circuit 102 may provide a plurality of data voltages to the corresponding data lines DL via the gamma curve compensation circuits IGC according to an image data, so as to drive each of the data lines DL and make the pixel (not shown) on the data lines DL to display an image frame according to data voltages. Moreover, the compensation control circuit 104 may output a control signal Vfrd to each of the gamma curve compensation circuits IGC according to a frame rate of the liquid crystal display apparatus, so as to control each of the gamma curve compensation circuits IGC to adjust the data voltages provided the data lines DL and perform gamma curve compensation.

Figure 2:
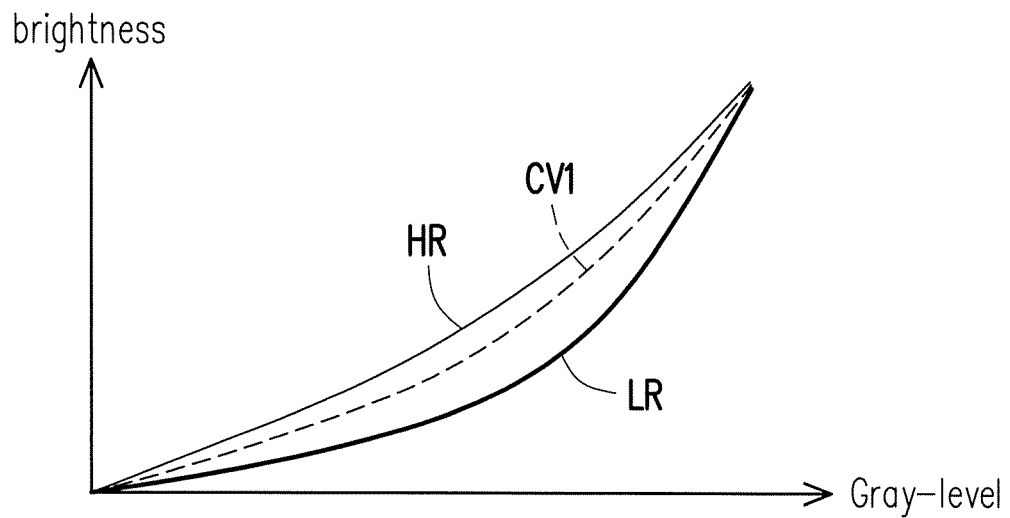
FIG. 2 is a schematic view of a gamma curve compensation according to one embodiment of the invention.

For example, FIG. 2 is a schematic view of a gamma curve compensation according to one embodiment of the invention. Referring to FIG. 2, in FIG. 2, a curve HR is a gamma curve corresponding to the liquid crystal display apparatus with high frame rate, and a curve LR is a gamma curve corresponding to the liquid crystal display apparatus with low frame rate. Meanwhile, a curve CV1 is a predetermined gamma curve. The curves HR and LR in FIG. 2 show that the change in the frame rate of the liquid crystal display apparatus can indeed change the characteristic of gamma curve. With the compensation control circuit 104 that controls each of the gamma curve compensation circuits IGC to adjust the data voltages provided to the data lines DL according to the frame rate of the liquid crystal display apparatus, a relationship between the gray-level of the image data and pixel brightness can correspond to the curve CV1 to avoid occurrence of color shift in the display frame of the liquid crystal display apparatus, thereby improving the display quality of the liquid crystal display apparatus.

It should be indicated that, in some embodiments, the difference in color-resist materials of the pixel with different colors is likely to cause change in the gamma curve. For example, low frame rate causes color shift in gray-level easily; or the difference in manufacturing process is also likely to cause shift in gamma curve and lead to color shift. At this time, the compensation control circuit 104 may further output control signals Vsh1, Vsh 2 or Vsh 3 (which may respectively correspond to pixels of different colors such as red, green and blue colors) according to the color of the pixel driven by the data lines DL corresponding to each of the gamma curve compensation circuits IGC, so as to control the gamma curve compensation circuits IGC to adjust the data voltages provided to the data lines DL, such that the relationship between the gray-level of the image data and pixel brightness can correspond to the curve CV1, thereby improving the display quality of the liquid crystal panel. Furthermore, the gamma curve compensation circuits IGC may be disposed, for example, on a printed circuit board, or fabricated on an active array substrate of the liquid crystal display apparatus using an in-cell processing method without being additionally disposed on the printed circuit board, thereby saving the manufacturing cost of the liquid crystal display apparatus. Moreover, in the embodiment, although each of the gamma curve compensation circuits IGC corresponds to one data line DL, which should not be construed as a limitation to the invention. In other embodiments, one gamma curve compensation circuit IGC may also correspond to a plurality of data lines DL; that is, the gamma curve compensation may be performed to the pixel on the plurality of data lines DL via one gamma curve compensation circuit IGC. For example, the data line which is electrically connected to a red pixel corresponds to the same gamma curve compensation circuit IGC; the data line which is electrically connected to a green pixel corresponds to the same gamma curve compensation circuit IGC; the data line which is electrically connected to a blue pixel corresponds to the same gamma curve compensation circuit IGC. In other embodiments, one gamma curve compensation circuit IGC may also correspond to all of the data line lines DL.

Figure 3:
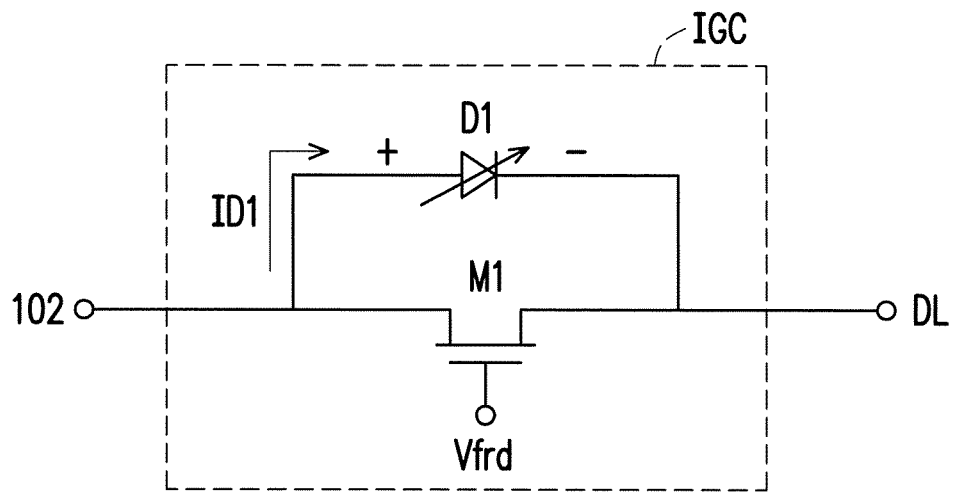
FIG. 3 is a schematic view of a gamma curve compensation circuit according to one embodiment of the invention.

FIG. 3 is a schematic view of a gamma curve compensation circuit according to one embodiment of the invention. Referring to FIG. 3, specifically, the aforesaid gamma curve compensation circuit IGC may be implemented as illustrated in FIG. 3. The gamma curve compensation circuit IGC may include a variable resistance (in other embodiments, the variable resistance may be implemented via other approaches and not limited to a transistor M1) implemented by the transistor M1 and a rectifying circuit D1. The transistor M1 is coupled between the data-line driving circuit 102 and the data lines DL corresponding to the data-line driving circuit 102. A control end of the transistor M1 is coupled to the compensation control circuit 104. In addition, the rectifying circuit D1 and the transistor M1 are connected in parallel between the data-line driving circuit 102 and the data line DL corresponding to the rectifying circuit D1. The compensation control circuit 104 may adjust the resistance value of the transistor M1 according to the frame rate of the liquid crystal display apparatus. The rectifying circuit D1 may be implemented via, for example, a diode, which can make the current which flows through the rectifying circuit D1 to flow unidirectionally from the data-line driving circuit 102 to the data line DL corresponding to the rectifying circuit D1.

For example, when the frame rate of the liquid crystal display apparatus is relatively low, the compensation control circuit 104 may increase the voltage value of the control signal Vfrd to raise the degree of conductivity of the transistor M1 (i.e. decreasing the resistance value of the variable resistance). By doing so, the data voltage of the pixel that is last divided to the data line can be increased; accordingly, the problem that the liquid crystal molecules are not completely twisted due to current leakage of pixel that is relatively serious during low frame rate can be improved, and the relationship between the gray-level of the image data and the pixel brightness can correspond to the predetermined gamma curve. Likewise, when the frame rate of the liquid crystal display apparatus is relatively high, the compensation control circuit 104 may perform gamma curve compensation via controlling the degree of conductivity of the transistor M1. At this time, the current leakage of pixel is relatively mild as compared with the condition where the frame rate is low; therefore, the voltage value of the control signal Vfrd is lower as compared with the condition where the frame rate is low. Moreover, since the diode has different resistance values under different bias voltages, the rectifying circuit D1 may perform compensation to the gamma curve in corresponding to different data voltages. For example, since the diode with higher bias voltage has a smaller resistance value, when the data voltage is higher (i.e. gray-level is greater), the rectifying circuit D1 may make the voltage that is last divided to the pixel to be lower, thereby inhibiting the gamma curve difference occurred in the condition where the frame rate is high.

Figure 4:
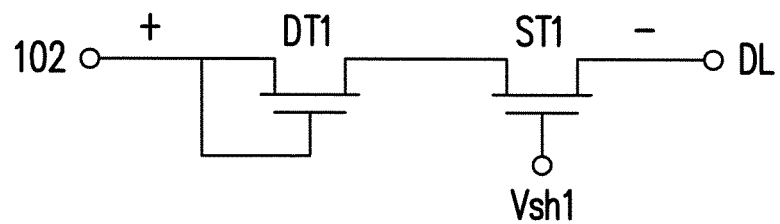
FIG. 4 is a schematic view of a rectifying circuit according to one embodiment of the invention.
Figure 5:
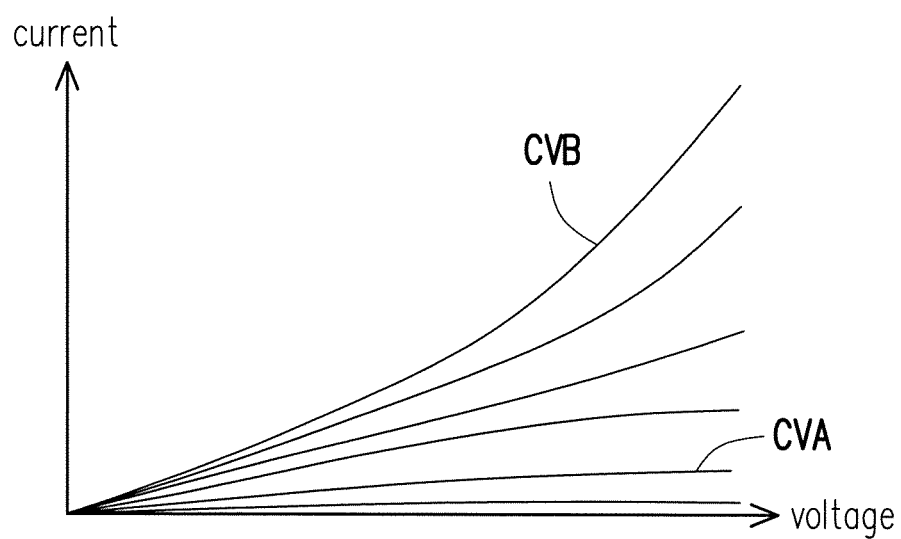
FIG. 5 is a diagram illustrating a relationship between a voltage at a control end of a transistor in a rectifying circuit and a current flowing through the transistor.

FIG. 4 is a schematic view of a rectifying circuit according to one embodiment of the invention. Referring to FIG. 4, specifically, the rectifying circuit D1 may be, for example, a transistor DT1 and a transistor ST1, wherein a gate and a drain of the transistor DT1 are coupled together to serve as a rectifying diode. A drain and a source of the transistor DT1 are respectively coupled to the data-line driving circuit 102 and the transistor ST1. The rectifying diode constituted by the transistor DT1 may perform compensation to the gamma curve in corresponding to different data voltages as described above. Additionally, the transistor ST1 is coupled between the transistor DT1 and the data line DL, and a control end of the transistor ST1 is coupled to the compensation control circuit 104. A diagram showing the relationship between the voltage at the control end of the transistor ST1 and a current flowing through the transistor ST1 may be as illustrated in FIG. 5. When the voltage value of the control signal Vsh1 is smaller, the transistor ST1 gets saturated more easily. At this time, a corresponding curvature of the voltage-current curve is smaller (e.g. curve CVA). On the other hand, when the voltage value of the control signal Vsh1 is larger, the transistor ST1 gets saturated less easily. At this time, the corresponding curvature of the voltage-current curve is larger (e.g. curve CVB). As described in the above embodiment, the compensation control circuit 104 may output the control signals Vsh1, Vsh2 or Vsh3 according to the color of the pixel driven by the data lines DL corresponding to each of the gamma curve compensation circuits IGC to select a proper voltage-current curve, so as to perform compensation to the gamma curve. For instance, in the embodiment, if the pixel corresponding to the gamma curve compensation circuit IGC is in red color, and the control signal corresponding to the red pixel is Vsh1, the compensation control circuit 104 may output the control signal Vsh1 to the control end of the transistor ST1 according to the pixel color corresponding to the gamma curve compensation circuit IGC, so as to accurately perform gamma curve compensation to the red pixel corresponding to the gamma curve compensation circuit IGC.

Figure 6:
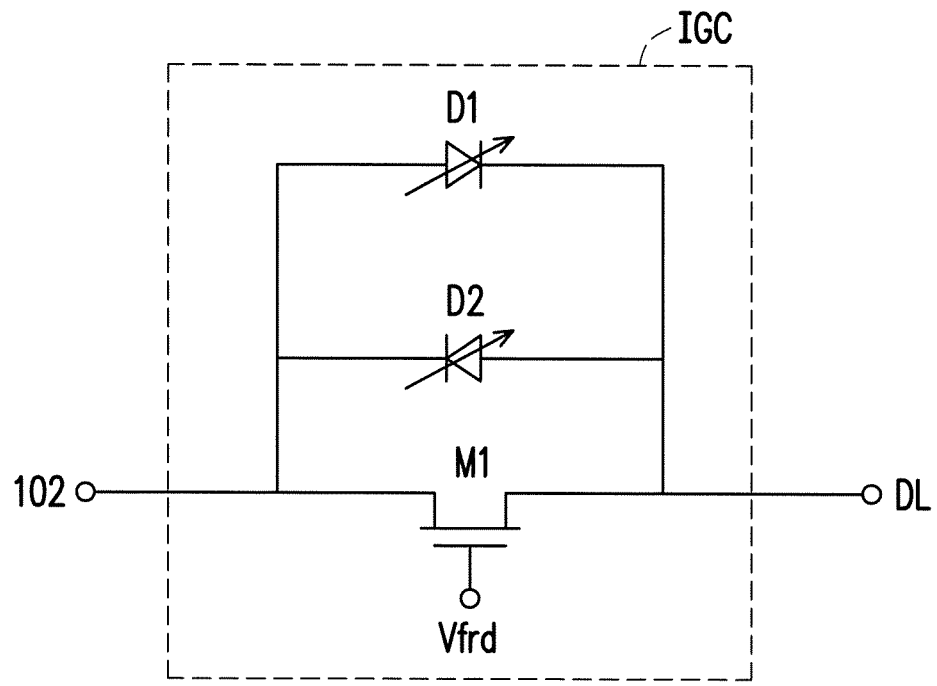
FIG. 6 is a schematic view of another gamma curve compensation circuit according to one embodiment of the invention.

It should be pointed out that, the above embodiment describes a gamma curve compensation circuit designed for data voltage with single polarity. To ensure the display quality of the liquid crystal display apparatus, a driving method that reverses the polarity of liquid crystal is generally used to drive pixels. FIG. 6 is a schematic view of another gamma curve compensation circuit according to one embodiment of the invention. Referring to FIG. 6, the difference between the gamma curve compensation circuit IGC of the embodiment and the one in the embodiment of FIG. 3 is that, the gamma curve compensation circuit IGC of the embodiment further includes a rectifying circuit D2, which is connected with the transistor M1 and the rectifying circuit D1 in parallel between the data-line driving circuit 102 and the data line DL corresponding to the rectifying circuit D2, wherein the current which flows through the rectifying circuit D2 flows unidirectionally from the data line DL corresponding to the rectifying circuit D2 to the data-line driving circuit 102. Likewise, the compensation control circuit 104 may control the rectifying circuit D2 to adjust the amount of the current which flows through the rectifying circuit D2 according to the color of the pixel driven by the data line DL corresponding to each of the gamma curve compensation circuits IGC, so as to perform gamma curve compensation.

Furthermore, since the current-limiting directions of the rectifying circuits D2 and D1 of the embodiment are different, no matter whether the data voltage is in positive polarity or negative polarity, the gamma curve compensation circuit IGC can perform gamma curve compensation correspondingly in either case. The rectifying circuit D2 may be implemented based on, for example, the embodiment of FIG. 4; therefore, the compensation control circuit 104 may selectively adjust the voltage value of the control signal (e.g. control signal Vsh1) of the rectifying circuit D1 or D2 according to the polarity of the pixel driven by the data lines DL corresponding to each of the gamma curve compensation circuits IGC, so as to correspondingly perform gamma curve compensation to the color and the polarity of the pixel driven by the data line DL corresponding to the gamma curve compensation circuit 102. Since the implementation of the gamma curve compensation circuit 102 is already described in details in the embodiment provided above, people of ordinary skill in the art should be able deduce the detailed operation of the gamma curve compensation circuit 102 of the embodiment based on the above embodiment; therefore, no repetition is incorporated herein.

Figure 7:
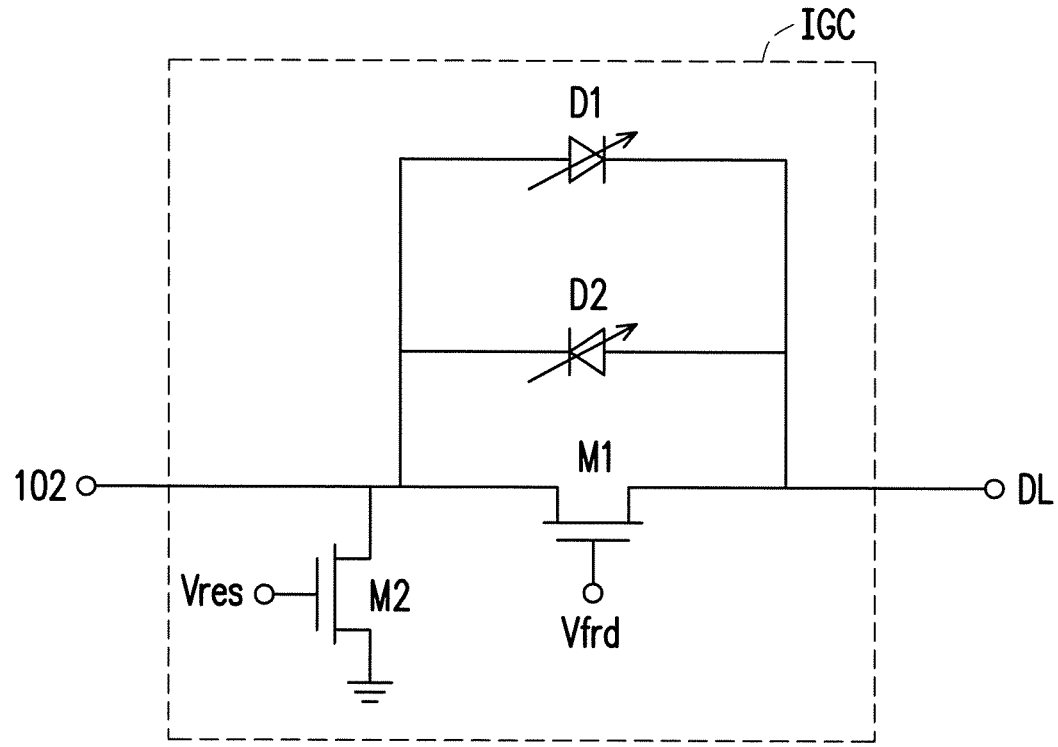
FIG. 7 is a schematic view of still another gamma curve compensation circuit according to one embodiment of the invention.

FIG. 7 is a schematic view of still another gamma curve compensation circuit according to one embodiment of the invention. Referring to FIG. 7, the difference between the gamma curve compensation circuit IGC of the embodiment and the one of the embodiment of FIG. 6 is that the gamma curve compensation circuit IGC of the embodiment further includes a discharging circuit, as shown in FIG. 7, which may be implemented via a transistor M2. The transistor M2 is coupled between the drain of the transistor M1 and the common voltage (the common voltage in the embodiment is ground voltage). A control end of the transistor M2 is coupled to the compensation control circuit 104. Before the pixel corresponding to the gamma curve compensation circuit IGC is driven, the compensation control circuit 104 may output a control signal Vres to the control end of the transistor M2 (i.e. discharging circuit) so as to discharge the data line DL corresponding to the gamma curve compensation circuit IGC to the common voltage. By doing so, the effect caused by the charge voltage of the previous pixel to the rectifying circuits D1 and D2 can be eliminated so as to perform the gamma curve compensation more accurately.

Figure 8:
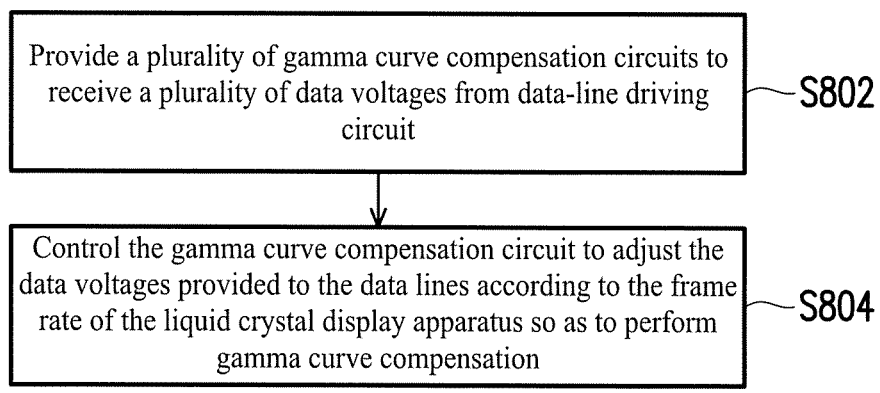
FIG. 8 is a driving method of a liquid crystal display apparatus according to one embodiment of the invention.

FIG. 8 is a driving method of a liquid crystal display apparatus according to one embodiment of the invention. Referring to FIG. 8, the above embodiment shows that the driving method of the liquid crystal display apparatus at least includes the following steps. First of all, the plurality of gamma curve compensation circuits are provided to receive the plurality of data voltages from the data-line driving circuit (step S802). Next, the gamma curve compensation circuit is controlled to adjust the data voltages provided to the data lines according to the frame rate of the liquid crystal display apparatus, so as to perform the gamma curve compensation (step S804). In some embodiments, the step S804 may further perform gamma curve compensation according to at least one of the color and the polarity of the pixel driven by the data line corresponding to the gamma curve compensation circuit. Additionally, before the gamma curve compensation circuit is controlled to provide the data voltages to the data lines, the data lines may be discharged to the common voltage so as to perform the gamma curve compensation more accurately.

In summary, according to the embodiments of the invention, the gamma curve compensation circuit may be controlled to adjust the data voltages provided to the data lines according to the frame rate of the liquid crystal display apparatus, so as to perform gamma curve compensation and improve the display quality of the liquid crystal display apparatus. In some embodiments, the gamma curve compensation may be further performed according to at least one of the color and the polarity of the pixel driven by the data line corresponding to the gamma curve compensation circuit so as to perform the gamma curve compensation more accurately.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A display apparatus, comprising: a plurality of data lines; a data-line driving circuit; a plurality of gamma curve compensation circuits, respectively coupled to the at least one corresponding data line and the data-line driving circuit, the data-line driving circuit providing a plurality of data voltages to the data lines via the gamma curve compensation circuits to drive the data lines; and a compensation control circuit, coupled to the gamma curve compensation circuits, controlling the gamma curve compensation circuits to adjust the data voltages provided to the data lines according to a frame rate of the display apparatus so as to perform gamma curve compensation, wherein the compensation control circuit comprises: a variable resistance, and the compensation control circuit adjusts a resistance value of the variable resistance according to the frame rate of the display apparatus, wherein the variable resistance is implemented by a first transistor, and a control end of the first transistor receives a control signal for adjusting the resistance value; and a first rectifying circuit, connected to the variable resistance in parallel between the data-line driving circuit and at least one data line corresponding to the first rectifying circuit, a current flowing through the first rectifying circuit flows unidirectionally from the data-line driving circuit to the at least one data line corresponding to the first rectifying circuit.

2. The display apparatus according to claim 1, wherein the compensation control circuit further controls the gamma curve compensation circuits to adjust the data voltages provided to the data lines according to a color of a pixel driven by the at least one data line corresponding to the gamma curve compensation circuits.

3. The display apparatus according to claim 1, wherein the compensation control circuit further controls the first rectifying circuit to adjust an amount of the current flowing through the first rectifying circuit according to a color and a polarity of a pixel driven by the at least one data line corresponding to each of the gamma curve compensation circuits.

4. The display apparatus according to claim 1, wherein the first rectifying circuit comprises: a rectifying diode; and a second transistor, connected to the rectifying diode in series between the data-line driving circuit and the at least one data line corresponding to the first rectifying circuit, a control end of the second transistor is coupled to the compensation control circuit, and a degree of conductivity of the second transistor is subject to the compensation control circuit.

5. The display apparatus according to claim 1, wherein each of the gamma curve compensation circuits further comprises: a second rectifying circuit, connected to the variable resistance and the first rectifying circuit in parallel between the data-line driving circuit and at least one data line corresponding to the second rectifying circuit, a current flowing through the second rectifying circuit flows unidirectionally from the at least one data line corresponding to the second rectifying circuit to the data-line driving circuit.

6. The display apparatus according to claim 5, wherein the compensation control circuit further controls the second rectifying circuit to adjust an amount of the current flowing through the second rectifying circuit according to a color and a polarity of a pixel driven by the at least one data line corresponding to each of the gamma curve compensation circuits.

7. The display apparatus according to claim 5, wherein the second rectifying circuit comprises: a rectifying diode; and a second transistor, connected to the rectifying diode in series between the data-line driving circuit and the at least one data line corresponding to the second rectifying circuit, a control end of the second transistor is coupled to the compensation control circuit, and a degree of conductivity of the second transistor is subject to the compensation control circuit.

8. The display apparatus according to claim 1, wherein each of the gamma curve compensation circuits comprises: a discharging circuit, coupled between an end of the variable resistance and a common voltage, a control end of the discharging circuit is coupled to the compensation control circuit, subject to the compensation control circuit to discharge at least one data line corresponding to the discharging circuit to the common voltage before a pixel corresponding to the discharging circuit is driven.

9. A gamma curve compensation circuit, adapted to a display apparatus, the display apparatus comprises a plurality of data lines, and comprising: a variable resistance, wherein the variable resistance is implemented by a first transistor, and a control end of the first transistor receives a control signal for adjusting a resistance value of the variable resistance; and a first rectifying circuit, connected to the variable resistance in parallel between a data-line driving circuit of the display apparatus and at least one data line corresponding to the first rectifying circuit, a current flowing through the first rectifying circuit flows unidirectionally from the data-line driving circuit to the at least one data line corresponding to the first rectifying circuit, the resistance value of the variable resistance changes according to a frame rate of the display apparatus so as to adjust a data voltage provided to the data line to perform gamma curve compensation.

10. The gamma curve compensation circuit according to claim 9, the resistance value of the variable resistance further changes according to a color of a pixel driven by the at least one data line corresponding to the gamma curve compensation circuit.

11. The gamma curve compensation circuit according to claim 9, wherein the first rectifying circuit adjusts an amount of the current flowing through the first rectifying circuit according to a color and a polarity of a pixel driven by the at least one data line corresponding to the gamma curve compensation circuit.

12. The gamma curve compensation circuit according to claim 9, wherein the first rectifying circuit comprises; a rectifying diode; and a second transistor, connected to the rectifying diode in series between the data-line driving circuit and the at least one data line corresponding to the first rectifying circuit, the second transistor adjusts a degree of conductivity according to a color and a polarity of a pixel driven by the at least one data line corresponding to the gamma curve compensation circuit.

13. The gamma curve compensation circuit according to claim 9, further comprising: a second rectifying circuit, connected to the variable resistance and the first rectifying circuit in parallel between the data-line driving circuit and at least one data line corresponding to the second rectifying circuit, a current flowing through the second rectifying circuit flows unidirectionally from the at least one data line corresponding to the second rectifying circuit to the data-line driving circuit.

14. The gamma curve compensation circuit according to claim 13, wherein the second rectifying circuit adjusts an amount of the current flowing through the first rectifying circuit according to a color and a polarity of a pixel driven by the at least one data line corresponding to the gamma curve compensation circuit.

15. The gamma curve compensation circuit according to claim 14, wherein the second rectifying circuit comprises: a rectifying diode; and a second transistor, connected to the rectifying diode in series between the data-line driving circuit and the at least one data line corresponding to the second rectifying circuit, the second transistor adjusts a degree of conductivity according to the color and the polarity of the pixel driven by the at least one data line corresponding to the gamma curve compensation circuit.

16. The gamma curve compensation circuit according to claim 9, wherein the gamma curve compensation circuit further comprises: a discharging circuit, coupled between an end of the variable resistance and a common voltage, and discharging at least one corresponding data line to the common voltage before a pixel corresponding to the discharging circuit is driven.

17. A display apparatus, comprising: a plurality of data lines;

a data-line driving circuit; and a gamma curve compensation circuit, coupled to at least one corresponding data line and the data-line driving circuit, and comprising: a variable resistance, comprising a first end, a second end and a control end, wherein the variable resistance is implemented by a first transistor, and a control end of the first transistor receives a control signal for adjusting a resistance value of the variable resistance; and a first rectifying circuit, comprising a first end and a second end, wherein the first end of the first rectifying circuit is electrically connected to the first end of the variable resistance, and the second end of the first rectifying circuit is electrically connected to the second end of the variable resistance; and a second rectifying circuit comprising a first end and a second end, wherein the first end of the second rectifying circuit is electrically connected to the second end of the variable resistance, and the second end of the second rectifying circuit is electrically connected to the first end of the variable resistance.

18. The display apparatus according to claim 17, further comprising a discharging circuit comprising a first end, a second end and a control end, wherein the first end of the discharging circuit is electrically connected to the first end of the variable resistance, and the second end of the second rectifying circuit is electrically connected to a common voltage.

* * * * *